US008684442B2

(12) United States Patent  (10) Patent No.: US 8,684,442 B2
Lehman                    (45) Date of Patent:      Apr. 1, 2014

(54) HAND-DETACHABLE PORTABLE CYCLE WINDSHIELD WITH UNOBSCURED FIELD OF VIEW (71) Applicant: Daniel P. Lehman, Geneva, IN (US)

(72) Inventor: Daniel P. Lehman, Geneva, IN (US)

(*) Notice: Subject to any disclaimer, the term of this patent is extended or adjusted under 35 U.S.C. 154(b) by 0 days.

(21) Appl. No.: 13/663,754

(22) Filed: Oct. 30, 2012

(65) Prior Publication Data

US 2013/0106132 A1    May 2, 2013

Related U.S. Application Data (60) Provisional application No. 61/554,322, filed on Nov. 1, 2011.

(51) Int. Cl.
    B60N 99/00    (2006.01)
(52) U.S. Cl.
    USPC .......................................... 296/77.1
(58) Field of Classification Search
    USPC ................ 296/78.1, 77.1; 160/48, 49, 90
    See application file for complete search history.

(56) References Cited

U.S. PATENT DOCUMENTS

| 557,130 | A | 3/1896 | Jensen |
|---|---|---|---|
| 567,860 | A | 9/1896 | Monaghan |
| 597,298 | A | 1/1898 | Ross |
| 1,342,987 | A | 6/1920 | Chimino |
| 2,237,594 | A | 4/1941 | Dunlap |
| 2,368,109 | A | 1/1943 | Rundquist |
| 2,396,493 | A | 3/1946 | Comiskey |
| 2,411,131 | A | 11/1946 | Hanson |
| 2,564,800 | A | 8/1951 | Bates |
| 3,369,836 | A | 2/1968 | Haycock et al. |
| 3,829,152 | A | 8/1974 | Hobbs |
| 4,066,291 | A | 1/1978 | Hickman |
| D248,940 | S | * | 8/1978 | Saunders, IV ............... D12/182 |
| 4,465,315 | A | 8/1984 | Barstow |
| 4,790,555 | A | * | 12/1988 | Nobile ........................ 296/78.1 |
| 5,267,767 | A | * | 12/1993 | Farrow ........................ 296/78.1 |
| 5,658,035 | A | * | 8/1997 | Armstrong .................. 296/78.1 |
| 5,795,009 | A | 8/1998 | Sack et al. |
| 6,120,083 | A | 9/2000 | Gunther |
| 6,176,538 | B1 | 1/2001 | Lawson et al. |
| 6,196,614 | B1 | 3/2001 | Willey |
| 6,231,104 | B1 | 5/2001 | Roethel |
| 6,254,166 | B1 | * | 7/2001 | Willey ........................ 296/78.1 |
| 6,505,877 | B1 | * | 1/2003 | Devlin et al. ................ 296/78.1 |
| 6,808,219 | B2 | * | 10/2004 | Barber et al. ................ 296/78.1 |
| 6,974,175 | B2 | 12/2005 | Willey |

(Continued)

FOREIGN PATENT DOCUMENTS

| CN | 87204827 | 1/1988 |
|---|---|---|
| CN | 87212913 | 8/1988 |

(Continued)

OTHER PUBLICATIONS

NPL-kgmotorcycletire, J. Strong Industries Folding Windshield, Kawasaki Teryx Windshield, Free Ground Shipping, 2011, p. 1.

(Continued)

Primary Examiner — Lori Lyjak (57) ABSTRACT

Versions of the present invention comprise a hand-detachable, hand-adjustable, storable, portable windshield assembly for use with cycles and motorcycles adequate for highway use and that does not occlude the forward central viewing area of the rider.

19 Claims, 5 Drawing Sheets (56) References Cited

U.S. PATENT DOCUMENTS

| | | |
|---|---|---|
| 7,395,625 B2* | 7/2008 | Chladny .................. 40/591 |
| 7,552,959 B2 | 6/2009 | Salisbury |
| 7,753,430 B1 | 7/2010 | Elgin |
| 7,828,359 B2 | 11/2010 | Caprio |
| 7,828,360 B2 | 11/2010 | Salisbury |
| 7,896,014 B1 | 3/2011 | Chiang |
| 7,946,642 B1 | 5/2011 | Wu |
| 2002/0084126 A1* | 7/2002 | Bedard et al. .............. 180/190 |
| 2002/0131606 A1* | 9/2002 | Stanberry et al. ............ 381/86 |
| 2004/0183332 A1* | 9/2004 | Barber et al. .............. 296/78.1 |
| 2006/0062653 A1* | 3/2006 | Erskine et al. ............. 411/511 |
| 2009/0079219 A1* | 3/2009 | Caprio ................. 296/78.1 |
| 2009/0230715 A1 | 9/2009 | Brinkhorst |

FOREIGN PATENT DOCUMENTS

| | | |
|---|---|---|
| FR | 1117213 | 5/1956 |
| GB | 190120622 | 0/1902 |
| GB | 207380 | 11/1923 |
| GB | 308909 | 4/1929 |
| GB | 2218060 | 11/1989 |
| JP | 2005014876 | 1/2005 |
| WO | 9819904 | 5/1998 |

OTHER PUBLICATIONS

NPL-MotorcycleKB, How to roll-yer-own windshield, Apr. 1, 2007, p. 1.

* cited by examiner

HAND-DETACHABLE PORTABLE CYCLE WINDSHIELD WITH UNOBSCURED FIELD OF VIEW

CROSS-REFERENCES TO RELATED APPLICATIONS

This Application claims priority to provisional U.S. Application No. 61/554,322, Hand-Detachable Portable Cycle Windshield with Unobscured Field of View by Daniel P. Lehman, filed on Nov. 1, 2011.

STATEMENT REGARDING FEDERALLY SPONSORED RESEARCH OR DEVELOPMENT

Not applicable

BACKGROUND

Cycle riding, and particularly motorcycle riding, is a popular and pleasurable leisure activity. One of the primary advantages of cycling, and particularly motorcycling, is that the rider is not enclosed by a vehicle compartment and is much freer to experience and enjoy the sights, sounds, and smells of the open air during the ride. Cyclists, and particularly motorcyclists, are known to ride with helmets designed to optimize this open-air experience, or to ride without helmets.

One known drawback to cycle and motorcycle riding is that conditions such as increased speeds, inclement weather, or flying insects can make the riding experience less pleasurable, or, in some cases, unsafe.

It is known in the art to mitigate such unpleasurable or unsafe conditions by employing a windshield. It is further known in the art to make the windshield detachable. The detachable windshields known in the art have a number of disadvantages. Such windshields are not easily attachable and re-attachable without tools, nor are they easily adjusted by the rider without tools. Detachable windshields known in the art as adequate for use on motorcycles at highway speeds are not portable. Due to this lack of portability, the rider using such detachable windshields is required to decide whether or not to attach the windshield at the beginning of the ride, and must return to the location where the windshield is kept if it is later desired to be attached. Detachable windshields known to the art do not allow a rider to install or remove the windshield during a ride, to accommodate unforeseen or changing conditions, such as inclement weather, rising insect densities (particularly associated with dusk in summer climates), or an unforeseen desire for increased speed. Detachable windshields known to the art as sufficiently rigid for use at highway speeds further have the disadvantage of employing braces or support arms that occlude the rider's central forward field of vision while cycling or motorcycling.

SUMMARY

Versions of the present invention are directed to a detachable device for shielding the rider of a cycle or motorcycle from wind, weather, insects, and other open-air hazards. The present invention satisfies the need for a windshield that can easily and quickly be attached or removed from a cycle or motorcycle by hand, is adjustable to a wide range of cycle or motorcycle types, has sufficient rigidity to be used at highway speeds, is sufficiently portable to be carried with the rider, and, when in use, does not occlude the forward central vision of the rider.

In one version of the invention, the windshield assembly includes a windshield comprised of a substantially transparent sheet that is sufficiently rigid to withstand wind resistance at highway speeds when attached to the support assembly of versions of the invention, but, when detached, is sufficiently flexible to fold for transportation, including, by way of illustration, to roll into a scroll. The windshield assembly further comprises a support assembly that attaches to the windshield with detachable fasteners and forms the windshield to an appropriate shape for use. The windshield assembly of versions of the invention further comprises a mourning system that links the support assembly to a cycle or motorcycle using a slidably adjustable clamp or fastener that is movable between a plurality of positions.

The support assembly of versions of the invention further comprises vertical and horizontal windshield support arms, wherein the support assembly is adjustable in both the vertical and horizontal dimensions to accommodate motorcycles of various heights and widths as well as riders of various heights, such that when the windshield is attached to the support assembly and the support assembly attached to the cycle or motorcycle, the windshield is sufficiently supported to withstand the stresses of use at highway speeds and the central forward viewing area of the windshield remains unobstructed. Other versions and advantages of the invention will be apparent to those skilled in the art.

BRIEF DESCRIPTION OF THE DRAWINGS

These and other features, aspects, and advantages of the present invention will become better understood with regard to the following description and accompanying drawings, where.

DETAILED DESCRIPTION

Versions of the present invention are directed towards a portable, adjustable windshield assembly [1] for use in connection with a cycle or motorcycle [3].

A "windshield" [5] according to versions of the present invention is a substantially transparent sheet adapted to shelter a cycle or motorcycle rider when said sheet is shaped and affixed to a motorcycle in accordance with the teachings herein. In one version of the present invention, the windshield [5] is pre-drilled with holes for connection of the windshield [5] to the support assembly [7] with fasteners [15]. In another version of the invention, the windshield [5] is pre-drilled with multiple sets of holes for adjustable connection of the windshield [5] to the support assembly [7] with fasteners [15].

A windshield [5] according to the versions of this invention is made of material sufficiently rigid to withstand at least the physical stresses, pressures and resistances of use at highway speeds (that is, at 65 miles per hour or below) when affixed to motorcycle [3] as part of a windshield assembly [1] in accordance with the teachings of this invention. A windshield [5] according to the versions of this invention is further sufficiently flexible to be rolled by hand into a portable and storable scroll when detached from the support assembly [7] of versions of this invention. Materials appropriate for a windshield [5] according to the versions of the present invention include, by way of illustration, plastics with the physical characteristics discussed above including, preferably, Plexiglas. Other suitable materials will be apparent to one skilled in the art.

Figure 1:
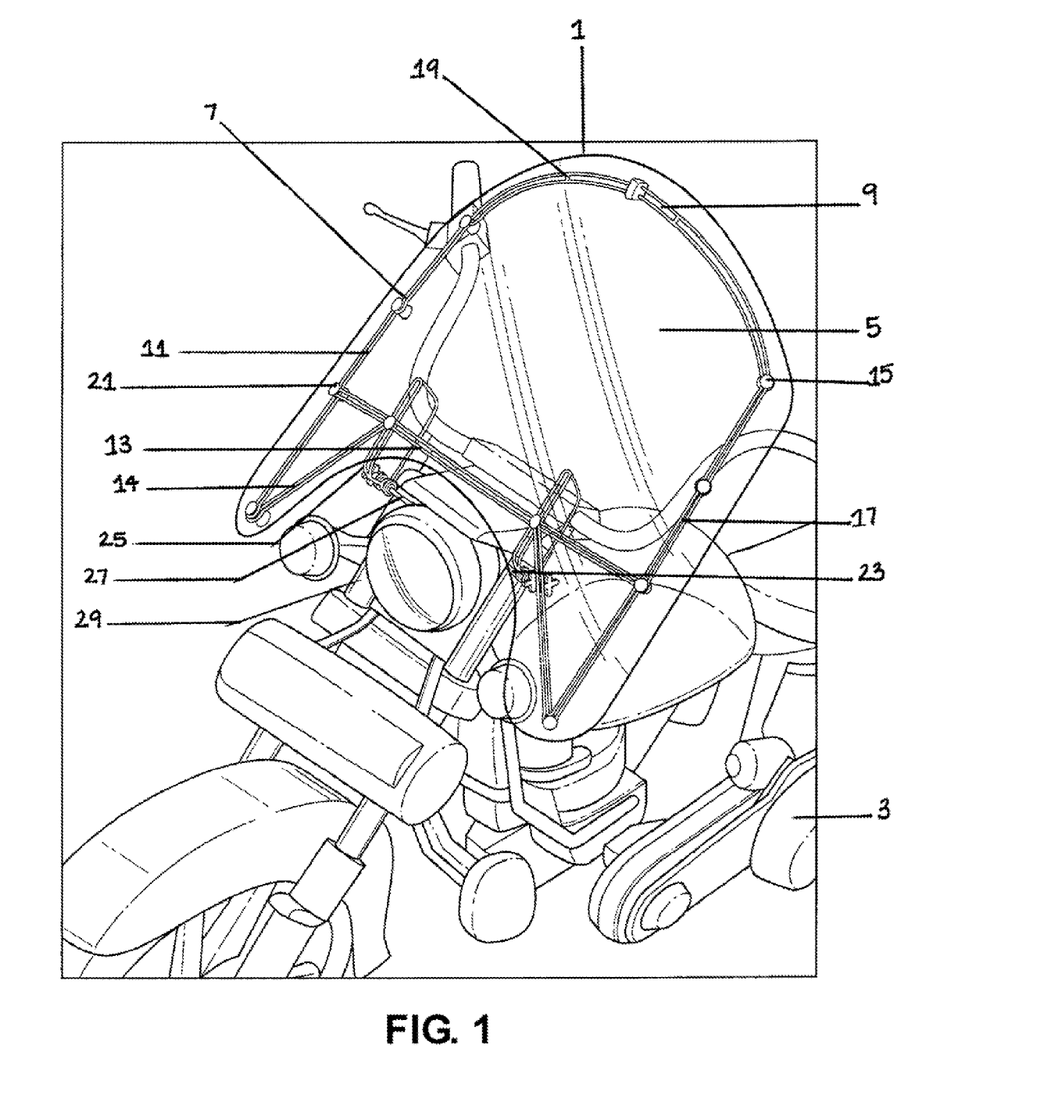
FIG. 1 shows a perspective view of a motorcycle with a windshield assembly according to one version of the present invention.
Figure 2:
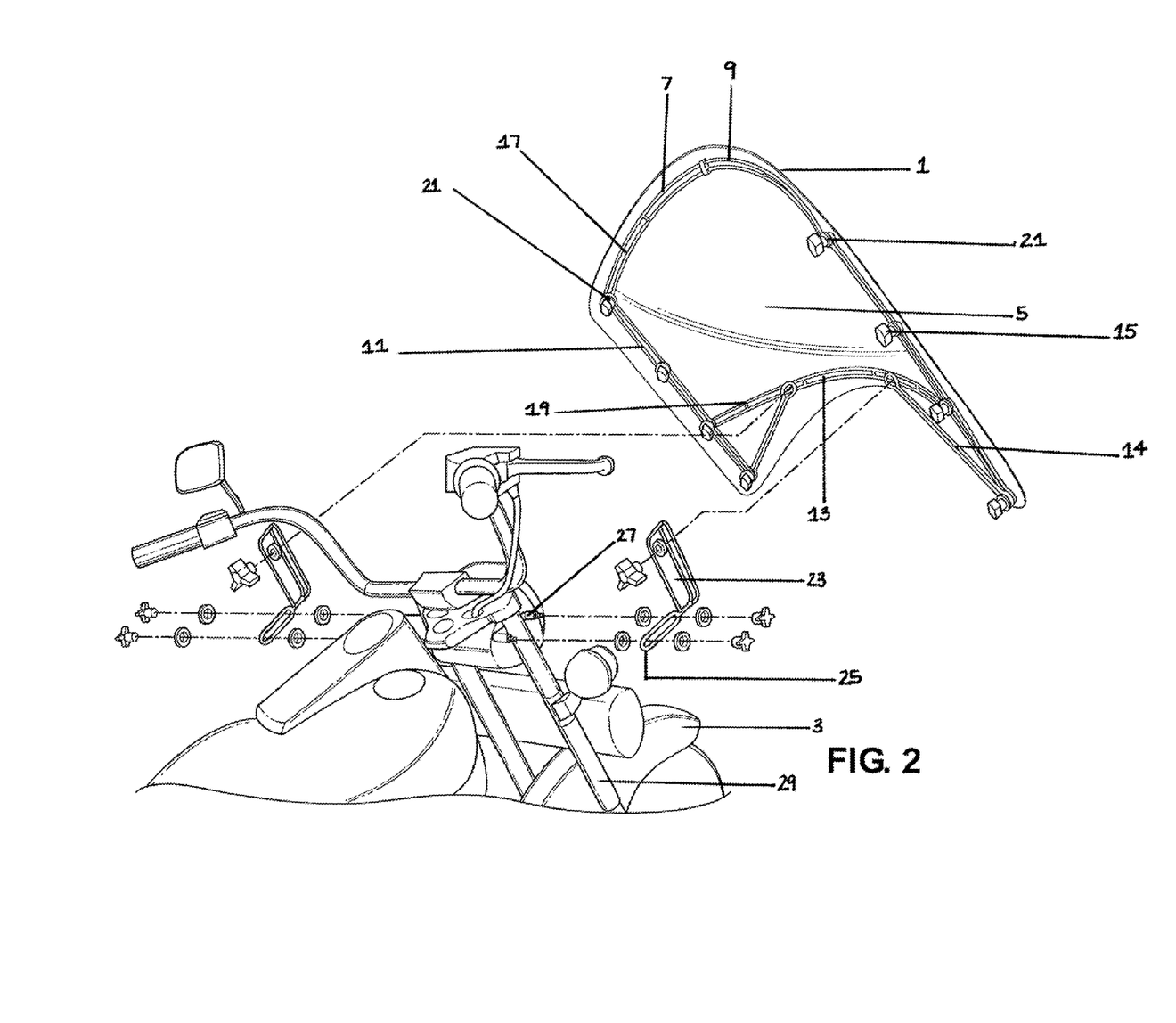
FIG. 2 shows an exploded view of a windshield assembly according to one version of the present invention.

In versions of the present invention, the windshield [5] is detachably connectible to a support assembly [7]. The support assembly [7] consists of a top horizontal support arm [9] connected to two or more vertical arms [11] and a bottom horizontal support arm [13] connected to the same two or more vertical support arms [11]. The windshield [5] is detachably connectible to the support assembly [7] by fasteners [15] that connect with windshield [5] to the support assembly using holes pre-drilled in the windshield [5]. In one version of the invention, the support assembly [7] includes bracing arms [14].

In versions of the invention, the vertical support arms [11] are detachably connected to the windshield [5] by fasteners [15], and said vertical support arms [11] may optionally be left connected or removed when the windshield [5] is folded for storage or transportation. In yet another version of the invention, the windshield [5] is detachably connected to the vertical support arms [11] and is further optionally connected by fasteners [15] to the top support arm [9], bottom support arm [13], and bracing arms [14].

Optionally, the windshield [5] is connected permanently to the vertical support arms [11] with fasteners [15]. In this version of the invention, the vertical support arms [11] remain attached to the windshield [5], and the windshield [5] can be removed by detaching said vertical support arms [11] from the support assembly [7]. In these embodiments, the vertical support arms [11] are shaped to permit the windshield [5] to fold, including to roll into a scroll, for storage or transportation.

The support assembly [7] is comprised of vertical and horizontal support arms [9][11][13], and, optionally, bracing aims [14]. In versions of the present invention, said support arms [9][11][13][14] each comprise two substantially parallel members, said parallel members joined at ends and further comprising a gap [17] between the parallel members for at least part of the length of the support arm. Fasteners [15] may be slidably or fixedly connected through the support arm gaps [17]. Support arm gaps [17] may optionally run along substantially all of the length of the support arm, or may optionally be interrupted by lateral braces [19] within the support arm. Optionally, the support arm gaps [17] may be interrupted by bolt-rings [21] through which fasteners [15] may be fixedly connected. The support arms [9][11][13][14] of the present invention may be made of any material sufficiently rigid to support the windshield [5] adequately when the windshield assembly [1] is in use at highway speeds. Appropriate materials include, by way of illustrations, steel, aluminum, metal alloys, and wood. Other materials will be apparent to one skilled in the art.

In versions of the invention, the top horizontal support arm [9] and bottom horizontal support arm [13] are slidably connected to the vertical support arms [11] by fasteners [15] that can be tightened to create a rigid connection, loosened to allow a slidable connection, or removed to allow disconnection. In another version of the invention, the top horizontal support arm [9] and bottom horizontal support arm [13] are detachably connected to two or more vertical support arms [11] by fasteners [15] that can be fastened for connection or detached for disconnection.

Optionally, a horizontal support arm [9][13] may comprise two pieces slidably connected to each other with a fastener [15] through the support arm gap [17] of each piece. The Fastener [15] can be tightened create a fixed connection, loosened to allow the length of the arm to be altered by adjusting the pieces of the arm slidably in relation to each other, or optionally can be removed to allow said pieces to be disconnected. In other versions of the invention, one or more of the top horizontal support arm [9] and bottom horizontal support arm [13] is comprised of two pieces hingedly connected by a hinging lateral brace [19]. In yet another version of the invention, one or more of the top horizontal support arm [9] and bottom horizontal support arm [13] are comprised of a single piece, which may optionally contain lateral braces [19] interrupting the support arm gaps [17].

In versions of the invention, one or more of the top support arm [9] and bottom support arm [13] are curved to adapt the windshield [1] to an aerodynamically advantageous shape when the windshield [5] is connected to the support structure [7]. In versions of the invention, one or more horizontal support arms [9][13] further connect to two or more vertical support arms [11] when the windshield assembly [1] is in use to create a support assembly structure in which no support arm [9][11][13][14] occludes the central forward viewing area of the windshield [5]. Optionally, one or more of horizontal support arms [9][13] connect to two or more vertical support arms [11] when the windshield assembly [1] is in use to create a support assembly structure in the shape of a square substantially centered over the central forward viewing area of the rider.

Optionally, a vertical horizontal support arm [11] may comprise two pieces slidably connected with a fastener [15] through the support arm gap [17] of each piece. The fastener [15] can be tightened create a fixed connection, loosened to allow the length of the arm to be altered by adjusting the pieces of the arm slidably in relation to each other, or optionally can be removed to allow said pieces to be disconnected. In other versions of the invention, one or more vertical support arms [11] is comprised of two pieces hingedly connected by a hinging lateral support [19]. In yet another version of the invention, one or more vertical support arms [11] comprised of a single piece, which may optionally contain lateral supports [17] interrupting the support arm gap [19].

Figure 5:
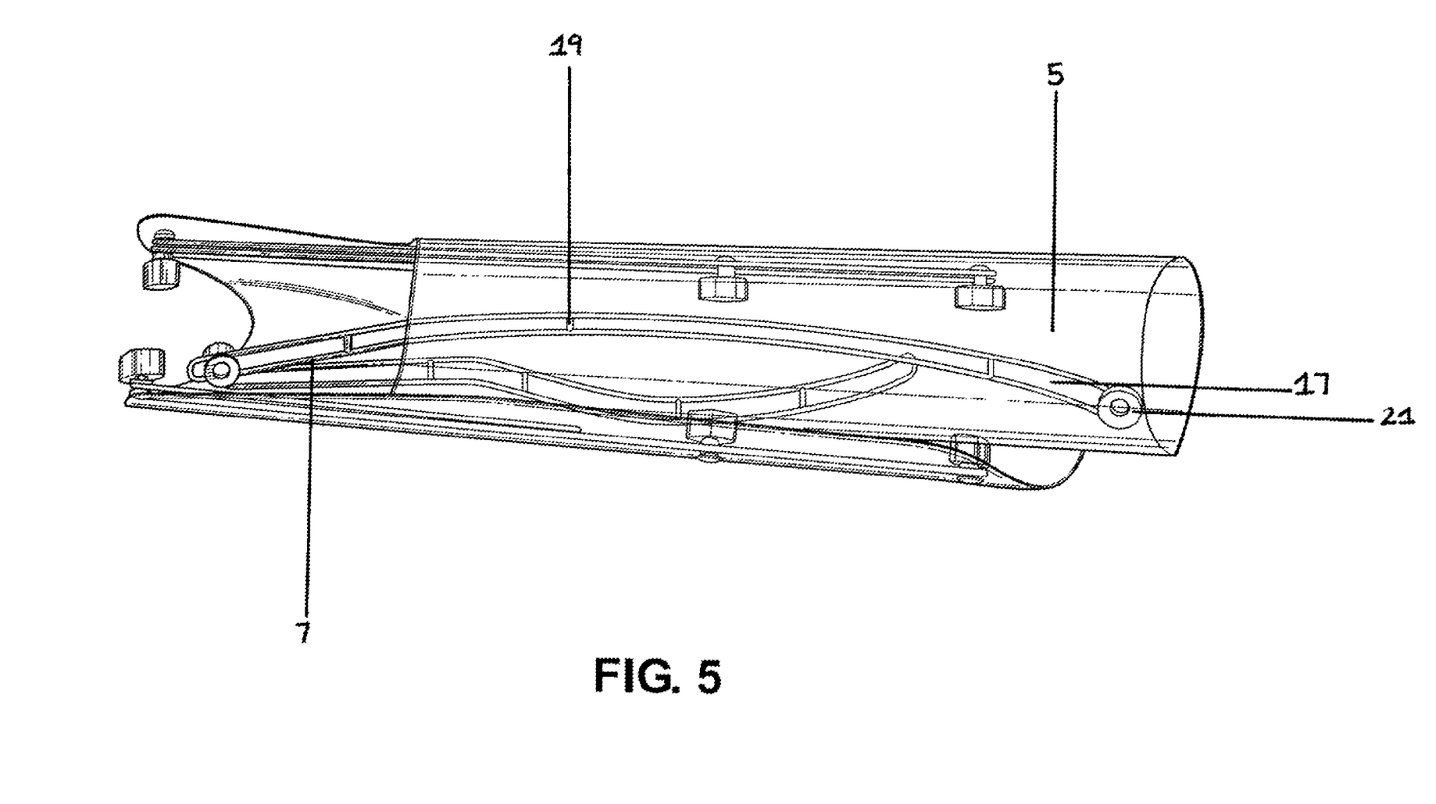
FIG. 5 shows a version of the present invention in a rolled configuration prepared for storage or transportation.

In versions of the invention, the support arms [9][11][13], and, optionally, bracing arms [14] are capable of being fit all together into the detached and folded windshield [1] for transportation or storage. In some versions of the invention, one or more vertical support arms [11] remain attached to the windshield [5] when the windshield [5] is removed from the support structure [7]. In these versions of the invention, the horizontal support arms [9][13], and, optionally, bracing arms [14] can, after removal from the windshield [5] from the support structure [7] be placed into a folded windshield [5] for transportation or storage. In other versions of the invention, the horizontal support arms [9][13], vertical support arms [11], and, optionally, bracing arms [14] are removed from the windshield [5] to prepare the assembly [1] for transportation or storage. In these versions of the invention, the horizontal support arms [9][13], vertical support arms [11], and, optionally, bracing arms [14], can, after removal from the windshield [5] and after the windshield [5] has been folded, be placed into the windshield [5] fold or roll for transportation or storage.

"Fasteners" [15] according to the present invention include common fasteners known to the art. Preferably, fasteners [15] comprise hand-attachable and hand-detachable fasteners such as screws, thumbscrews, wingnut screws, clamps, or the like. It will be appreciated by one skilled in the art that certain types of fasteners, such as thumbscrews, may be preferred for versions of the invention in which slidable connections are desired, whereas other types of fasteners may be preferred where a fixed connection is desired.

Figure 3:
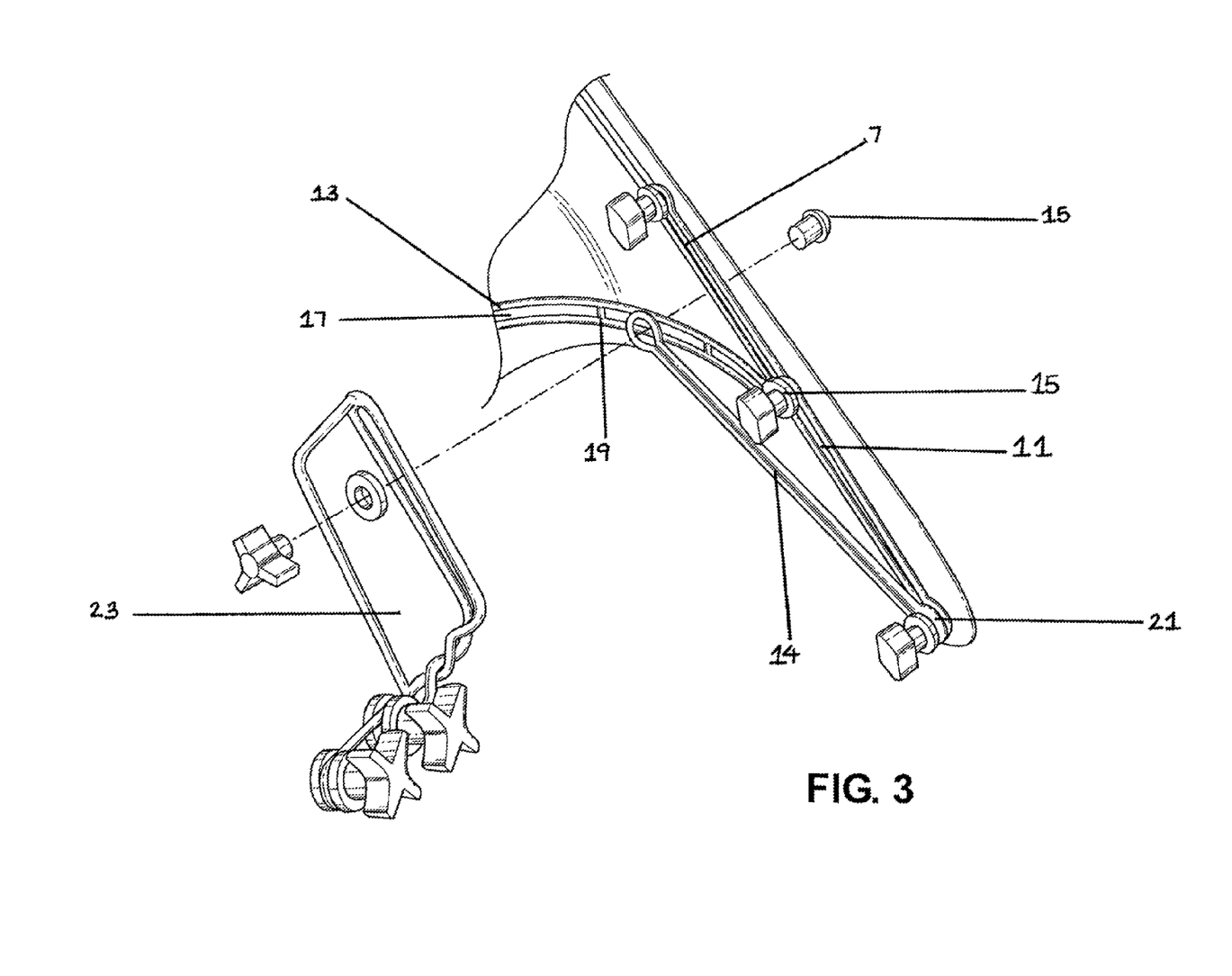
FIG. 3 shows an exploded view of a connection between the windshield assembly and the mounting bracket according to one version of the present invention.

Versions of the present invention further include a mounting apparatus [23]. The mounting apparatus [23] consists of one or more mounting brackets [25], preferably two, and a mounting clamp [27] for each mounting bracket [5]. In versions of the invention, each mounting bracket [25] detachably connects to the windshield assembly [1] by one or more fasteners [15] to a vertical support am [11]. Preferably, the mounting bracket [25] includes hinged member that allows the portion of the mounting bracket [25] suitable for connection to a vertical support arm [11] to rotate with respect to the portion of the mourning bracket [25] suitable for connection a mounting clamp [27]. Optionally, each mounting bracket [25] detachably connects to the windshield assembly [1] by one or more fasteners to a bracing arm [14]. The mounting bracket [25] detachably attaches to a cycle or motorcycle. Preferably, the mounting bracket [25] detachably attaches to the forks of a cycle or a motorcycle [3] by one or more mounting clamps [27]. Optionally, the mounting bracket [25] detachably attaches to the handlebars of a cycle or a motorcycle [3] by one or more mounting clamps [27].

The mounting apparatus [23] of versions of the present invention can be constructed of any material appropriate for the support arms [9][11][13][41]. The arms of the mounting apparatus of versions of the present invention may preferably be constructed similarly to the support arms [9][11][13][14], comprising parallel members containing a gap [17] and, optionally, lateral supports [19]. Other materials and constructions for the mounting apparatus will be apparent to one skilled in the art.

Figure 4:
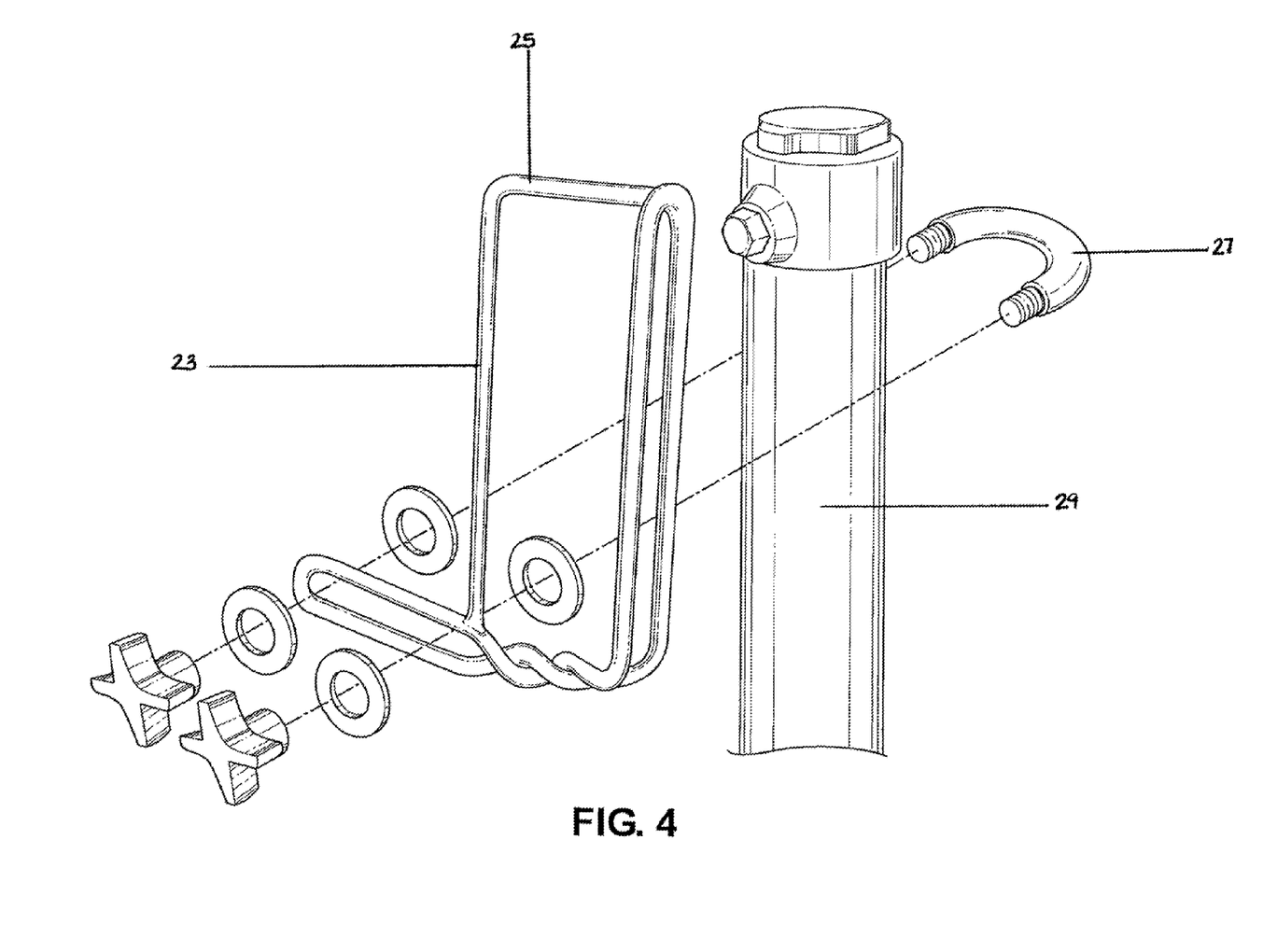
FIG. 4 shows an enlarged exploded view of the variable-position mounting clamp of the windshield assembly as shown in FIG. 1 according to a version of this invention.

The mounting clamp [27] of versions of the present invention is a clamp shaped to connect adjustably with portions of a cycle or motorcycle, including by way of illustration, the fork [29] or handlebar. Preferably, the mounting clamp [27] is shaped to connect adjustably with the fork [29] of a cycle or motorcycle. The mounting clamp [27] of versions of the present invention may optionally comprise of as U-clamp whose curved portion passes around the fork [29] of a motorcycle, and whose open end is secured detachably and adjustably to a mounting bracket [25] by fasteners [15]. It will be appreciated by those skilled in the art that through this mechanism the mounting bracket [23] can be adjustably fated to a variety of different motorcycles or cycles with a variety of different fork [29] diameters or varying distances between forks [29].

In versions of the present invention, the mounting apparatus [23] remains attached to a cycle or motorcycle, even when the support structure [7] and windshield [5] are detached. In other versions of the invention, the mounting bracket [23] can be detached from the cycle or motorcycle and may optionally be stored in the folded or rolled windshield [5].

When in use, the windshield assembly [1] of versions of the present invention will withstand at least the pressures, stresses, and resistances demanded by use of a motorcycle at highway speeds. When removed according to the teachings of the versions of the present invention, the windshield assembly [1] of versions of the present invention can be compactly stored and transported, optionally by folding the windshield [5] into a shape suitable for storage and capable of at least partially containing the support assembly [7], and placing said folded windshield and said support assembly [7], and, optionally, said mounting bracket [23] in a bag or container for transport. Preferably, the windshield [5] is folded for storage by rolling it into a scroll.

Accordingly, a rider using versions of the present invention can begin a ride without the windshield assembly [1] but with the windshield assembly [1] stored or transported on the cycle or motorcycle. The rider may then stop and install the windshield assembly [1] when desired and resuming riding at normal speeds. The rider may remove the windshield assembly [1] when it is no longer desired, without the need to return to a fixed location.

Although the present invention has been described in considerable detail with reference to certain preferred versions thereof, other versions are possible. For example, materials, shapes, windshield types, fastener types, or support arm configurations other than those described in detail herein may be used for the versions of this invention. Therefore, the spirit and scope of the claims should not be limited to the description of the preferred versions described herein.

What is claimed is:

1. A detachable windshield assembly for a cycle or motorcycle, said assembly comprising:
   (a) a flexible windshield detachably connected to a support structure;
   (b) said support structure detachably connected to a mounting apparatus; and
   (c) said mounting apparatus connected to a cycle or motorcycle;

wherein said support structure is adapted not to occlude the central forward viewing area of a rider when said assembly is in use.

2. The detachable windshield assembly of claim 1, in which said windshield is configured to be folded for transportation and storage when detached from said support structure.

3. The detachable windshield assembly of claim 2, in which said support structure is configured to fit substantially within said folded windshield for transportation and storage when said support structure is detached from said mounting apparatus.

4. The detachable windshield assembly of claim 1, in which said support structure further comprises at least two vertical support arms and at least one horizontal support arm.

5. The detachable windshield assembly of claim 4, in which said at least one of said support arms comprises two parallel members connected at each end.

6. The detachable windshield assembly of claim 5, in which said at least one support arms comprises two separate pieces connected by at least one fastener.

7. The detachable windshield assembly of claim 5, in which said at least one support arm further comprises support braces connecting said parallel members.

8. The detachable windshield assembly of claim 7, in which at least one of said support braces is hinged.

9. The detachable windshield assembly of claim 8, in which said windshield is configured to be folded for transportation and storage when detached from said support structure and said support structure is adapted to fit within said folded windshield without disconnection of said at least one horizontal arm from said at least two vertical arms.

10. A detachable windshield assembly for a cycle or motorcycle, said assembly comprising:
    (a) a flexible windshield fixedly connected to a support structure;

(b) said support structure detachably connected to a mounting apparatus; and (c) said mounting apparatus connected to a cycle or motorcycle;

wherein said support structure is adapted not to occlude the central forward viewing area of a rider when said assembly is in use.

11. The detachable windshield assembly of claim 10, in which said support structure further comprises at least two vertical support arms and at least one horizontal support arm.

12. The detachable windshield assembly of claim 11, in which said windshield is fixedly connected only to said at least two vertical support arms.

13. The detachable windshield assembly of claim 12, in which said windshield and said at least two vertical support arms are configured to be folded for transportation and storage when said at least two vertical support arms are detached from said horizontal support arms and said mounting apparatus.

14. The detachable windshield assembly of claim 13, in which said horizontal support arms are configured to fit substantially within said folded windshield for transportation and storage when said support structure is detached from said mounting apparatus and said horizontal support arms are detached from said vertical support arms.

15. The detachable windshield assembly of claim 11, in which at least one of said support arms comprises two parallel members connected at each end.

16. The detachable windshield assembly of claim 15, in which said at least one support arms comprises two separate pieces connected by at least one fastener.

17. The detachable windshield assembly of claim 11, in which said at least one support arm further comprises support braces connecting said parallel members.

18. The detachable windshield assembly of claim 17, in which at least one of said support braces is hinged.

19. The detachable windshield assembly of claim 17, in which said windshield and said at least two vertical support arms are configured to be folded for transportation and storage when said support structured is detached from said mounting apparatus without detaching said at least two vertical support arms from said at least one horizontal support arms.

* * * * *